Nov. 25, 1969    W. G. BINCKLEY ET AL    3,480,789
VOLTAGE REGULATOR WITH PLURAL PARALLEL POWER SOURCE SECTIONS
Filed July 28, 1966    4 Sheets-Sheet 1
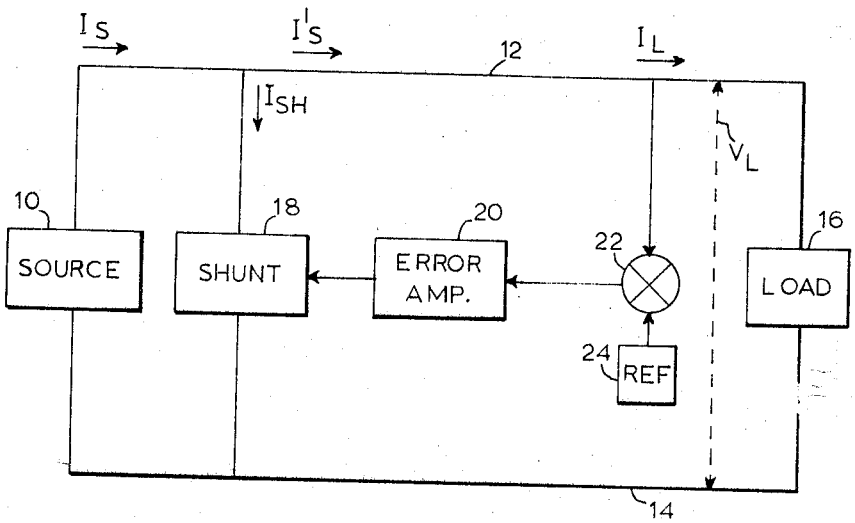
FIG. 1(a)    (PRIOR ART)
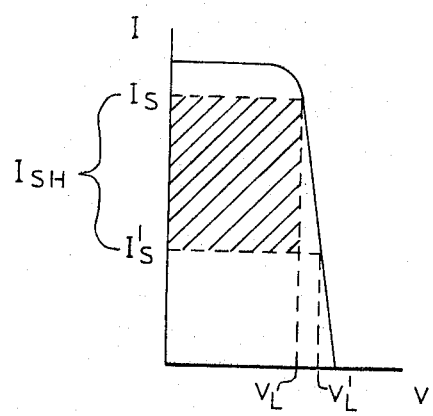
FIG. 1(b)
*INVENTOR.*
WILLIAM G. BINCKLEY
WARREN H. WRIGHT
BY Arthur Freilich
ATTORNEYS

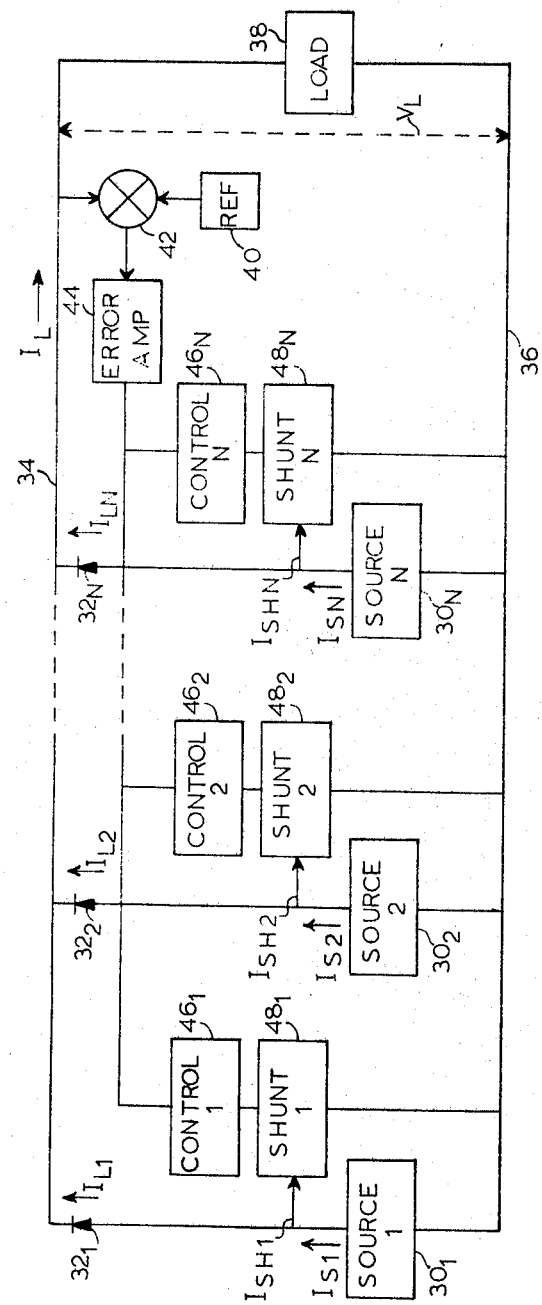
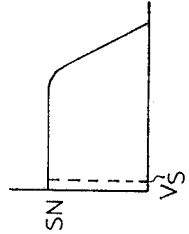
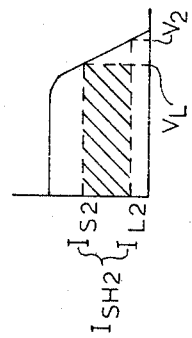
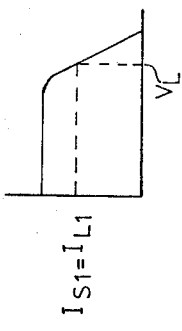
FIG. 2(a)
FIG. 2(b)
FIG. 2(c)
FIG. 2(d)
INVENTOR.
WILLIAM G. BINCKLEY
WARREN H. WRIGHT
BY Arthur Freilich
ATTORNEYS Nov. 25, 1969  W. G. BINCKLEY ET AL  3,480,789
VOLTAGE REGULATOR WITH PLURAL PARALLEL POWER SOURCE SECTIONS
Filed July 28, 1966                    4 Sheets-Sheet 3
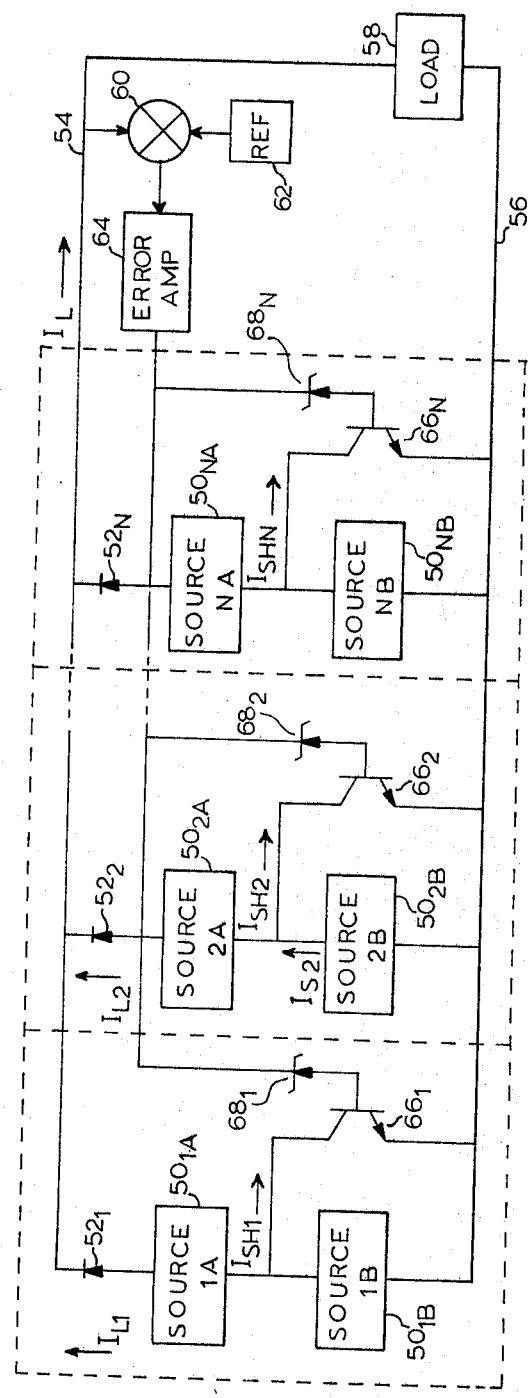
INVENTOR.
WILLIAM G. BINCKLEY
WARREN H. WRIGHT
BY Arthur Freilich
ATTORNEYS

United States Patent Office 3,480,789
Patented Nov. 25, 1969

3,480,789
VOLTAGE REGULATOR WITH PLURAL PARALLEL POWER SOURCE SECTIONS
William G. Binckley, Alhambra, and Warren H. Wright, Palos Verdes, Calif.; may be granted to National Aeronautics and Space Administration under provisions of 42 U.S.C. 2457(d)
Filed July 28, 1966, Ser. No. 568,620
Int. Cl. H02j 1/10, 3/38, 7/34
U.S. Cl. 307—53      13 Claims This invention relates to improved voltage regulating systems useful, for example, for controlling the output voltage of large electric power sources, such as solar cell arrays.

Many voltage regulating applications exist where it is very important that power dissipation and consequent heat generation be minimized. For example, in spacecraft installations, it is often necessary to limit the output voltage of high power (e.g., greater than 100 watts) solar cell arrays without developing any large localized heat dissipation areas. Although various regulators known to exist are capable of adequately limiting voltage variations, each is characterized by certain disadvantageous features which makes it unsatisfactory for spacecraft applications.

For example, dissipative type regulators often present thermal problems which preclude locating the dissipating elements within the spacecraft. As a consequence, it has been required to distribute the dissipating elements, e.g., power transistors, on the external solar array surfaces to permit direct radiative cooling. However, this approach requires the provision of heaters or special thermal energy storage devices in order to provide a sufficiently elevated temperature during periods of solar eclipse to maintain transistors above minimum operating temperature limits.

Some regulators use semiconductor switches to disconnect or short circuit sections of the solar array when low power demands exist. This reduces the amount of power remaining to be controlled by the regulator. This approach requires increased control complexity however, with a corresponding decreased reliability. Attempts have also been made to use regulators employing pulse width modulated switching transistors to control power dissipation in resistors. However, these regulators are characterized by increased radio frequency interference, increased control complexity, and filtering requirements which result in degraded response.

In view of the foregoing, it is an object of the present invention to provide an improved system for regulating or limiting the output voltage of various power sources.

It is a more particular object of the present invention to provide a dissipative voltage limiter system in which heat dissipation is minimized.

In accordance with the present invention, a load is connected to a supply line or bus across which is connected a plurality of parallel substantially identical power source sections. As is typical, the output voltage provided by each section increases as the output current drawn from that section decreases. In order to prevent the output voltage to the load from increasing as the load current demand is reduced, individually acting dissipative paths are provided, each being connected to one of the power source sections. In a first embodiment of the invention, the dissipative paths comprise shunt paths connected across the power source sections. The shunt paths are all controlled in response to the output of a comparator which compares the bus voltage against a reference. Thus, as the load current falls off and the bus voltage consequently begins to rise, the comparator will provide a control signal to the shunt paths to initially actuate one shunt path to thereby draw additional current from the associated power source section to lower the output voltage thereof. The additional current is of course steered through the actuated shunt path and does not affect the load. In another embodiment of the invention, the dissipative paths are connected in series with the power source sections.

The dissipative paths are preferably comprised of power transistors which of course dissipate very small amounts of power in their off and fully saturated states respectively. Maximum power is dissipated when the transistors are operated somewhere in their linear operating range. Means responsive to the comparator control signals are associated with each of the dissipative paths to actuate the paths in sequence as the control signal increases or decreases. In this manner, all of the dissipative path power transistors except one will either be in an off or saturated state. In other words, only one of the power transistors at a time can be operating in its linear range. As a consequence, power dissipation and localized heating will be minimized.

The novel features that are considered characteristic of this invention are set forth with particularity in the appended claims. The invention will best be understood from the following description when read in connection with the accompanying drawings, in which:

FIGURE 1(a) is a block diagram of a voltage limiting system in accordance with the prior art;

FIGURE 1(b) is a diagram illustrating the output characteristic of the power supply of FIGURE 1(a);

FIGURE 2(a) is a block diagram of a first embodiment of a voltage limiting system in accordance with the present invention;

Figure 4:
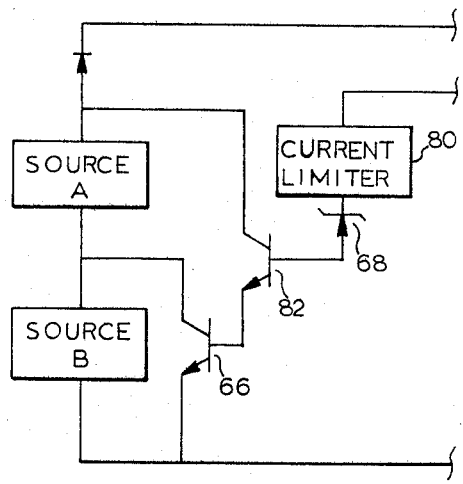
Figure 5:
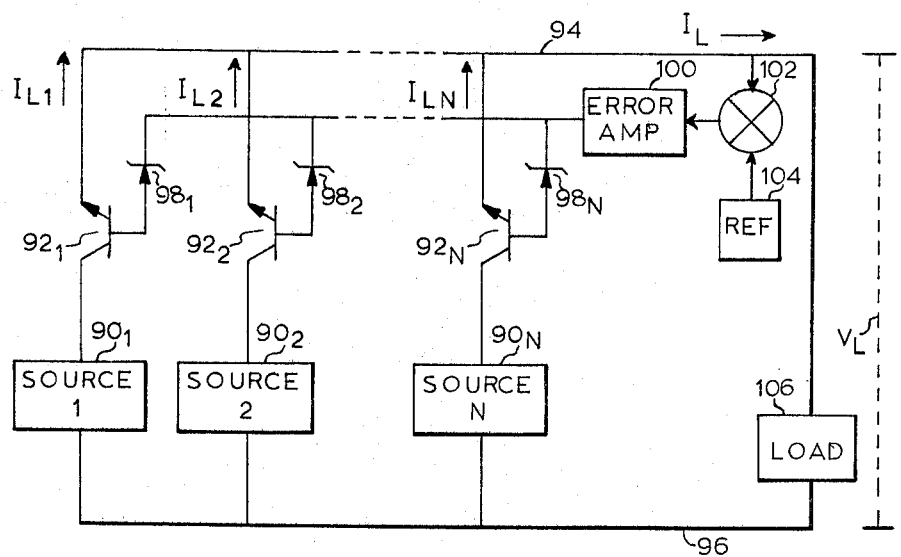

FIGURES 2(b)–(d) are diagrams respectively describing the characteristics of the power supply sections of FIGURE 2(a);

FIGURE 3(a) is a block diagram of a second embodiment of the voltage limiting system in accordance with the present invention;

FIGURES 3(b)–(g) are diagrams describing the operating characteristics of the power supply subsections of FIGURE 3(a);

FIGURE 4 is a block diagram of an alternative arrangement in accordance with the present invention; and FIGURE 5 is a block diagram of a still further embodiment of a voltage limiting system in accordance with the present invention.

Attention is initially called to FIGURE 1(a) of the drawings which illustrates a typical prior art dissipative shunt path voltage limiting system. More particularly, FIGURE 1(a) illustrates a power source 10 connected to current supply lines or bus conductors 12 and 14. A load 16 is connected across the lines 12 and 14 and draws a load current $I_L$ therefrom. It is desired that the voltage $V_L$ across the load be maintained constant for varying values of load $I_L$.

Prior to considering the elements employed in the configuration of FIGURE 1(a) to maintain the load voltage $V_L$ constant, attention is called to FIGURE 1(b) which illustrates a curve describing the output current-voltage characteristic of the power source 10. The characteristic described by FIGURE 1(b) is typical of many different types of power sources and as an example, it will be assumed herein that the power source 10 comprises an array of solar cells as are presently commonly employed for spacecraft applications.

The solid curve in FIGURE 1(b) illustrates that in order for the supply to provide an output voltage $V_L$, it is necessary to draw a current $I_S$ therefrom. If a lesser current $I_S$ is drawn, then the supply will provide a greater voltage, i.e. $V_L'$. In order to limit the voltage applied to the load 16 to the value of $V_L$ when a load current $I_L$ equal to $I_S'$ is being drawn, systems in the prior art have employed a shunt path 18 to draw a current $I_{SH}$. By drawing the current $I_S$ from the supply, the voltage $V_L$ will be established across the load and by steering the current $I_{SH}$ through the shunt path 18, the current $I_L$ (equal to $I_S'$) will be delivered to the load. The shunt path 18 in FIGURE 1(a) is controlled by a control voltage signal provided by an error amplifier 20. The error amplifier 20 is responsive to a comparator 22 which compares the load voltage $V_L$ with a voltage provided by a reference source 24. The reference source 24 can be conventional in construction and can, for example, comprise a Zener diode type device.

If the load voltage $V_L$ exceeds the voltage provided by the reference source 24, the comparator 22 provides a signal to the error amplifier 20 which in turn provides a control voltage signal to the shunt path 18 to increase the current $I_{SH}$ to thus increase the supply current $I_S$ and consequently lower the voltage $V_L$. On the other hand, if the load 16 varies so as to increase the current $I_L$, the load voltage $V_L$ would tend to decrease thus reducing the magnitude of shunt current $I_{SH}$ required. The comparator 22 will sense the decrease in the load voltage and thereby control the error amplifier 20 to decrease the shunt current $I_{SH}$.

As a consequence of drawing the shunt current $I_{SH}$ through the shunt path 18, power (IV) will be dissipated in the shunt path 18. This dissipated power is represented by the shaded area in FIGURE 1(b). The present invention as represented by FIGURES 2-4 reduces the magnitude of the power dissipation in the shunt path 18 to thus increase system efficiency and minimize large localized heat dissipation areas.

Attention is now called to FIGURE 2(a) which illustrates a first embodiment in accordance with the present invention. The embodiment of FIGURE 2(a) contemplates that the power source be segregated into N sections which are connected in parallel so as to be equivalent to the power source 10 illustrated in FIGURE 1(a). More particularly, the embodiment of FIGURE 2(a) illustrates power source sections $30_1$, $30_2$, and $30_N$. FIGURES 2(b), 2(c), and 2(d) respectively illustrate the output current versus output voltage characteristics of each of the source sections. Inasmuch as it has been assumed for purposes of clarity that the three source sections of FIGURE 2(a), when connected in parallel, are equivalent to the power source section 10 of FIGURE 1(a), it will be noted that the sum of the characteristic curves shown in FIGURES 2(b), (c), and (d) equal the characteristic curve of FIGURE 1(b). Each of the power source sections 30 is connected through a diode 32 to the current supply line 34. The lower terminal of each of the source sections is connected to supply line 36.

A load 38 is connected between the supply lines 34 and 36. A source of reference voltage 40 is connected to one input of a comparator 42 which compares the reference voltage to the voltage $V_L$ appearing across the load 38. The output of the comparator 42 is connected to the input of an error amplifier 44 whose output is connected to each of a plurality of voltage sensing control devices 46. Each of the control devices 46 controls a different shunt path 48. Thus, control device $46_1$ controls shunt path $48_1$ which is connected across source section $30_1$. Similarly, control device $46_2$ controls shunt path $48_2$ connected across source section $30_2$. Likewise, control device $46_N$ controls shunt path $48_N$ connected across source section $30_N$.

The construction of exemplary control devices 46 and shunt paths 48 will be discussed in connection with the embodiment of FIGURE 3(a). Suffice it to say at this point that the control devices 46 are each responsive to a different value of control voltage signal provided by error amplifier 44. Thus, let it be assumed that at a minimum value of control voltage, the control device $46_N$ turns on the shunt path $48_N$ to draw shunt current $I_{SHN}$. As the control voltage increases, the shunt path $48_N$ is driven into saturation and if the control voltage increases further, the control device $46_2$ activates the shunt path $48_2$ to start drawing current $I_{SH2}$. Thus, the control devices 46 are controlled in sequence such that as the control voltage increases, the shunt paths 48 will successively saturate. Moreover, each shunt path 48 is preferably designed to saturate at substantially the voltage required for the subsequent shunt path to begin to conduct. Thus, all of the shunt elements 48 except one will define either a nonconducting (full off) condition or a saturated (full on) condition with only one of the shunt paths operating in a linear region between a full on and a full off condition.

In order to understand the manner in which the embodiment of FIGURE 2(a) operates, attention is called to FIGURES 2(b), 2(c), and 2(d). The current $I_L$ drawn by the load 38 is equal to the sum of the currents $I_{L1}$, $I_{L2}$, and $I_{LN}$ applied to the supply line 34 through the diodes 32. As an example, let it be assumed that the current $I_L$ drawn by the load 38 is the same as that shown in FIGURE 1(b) and requires substantially the full output current from one of the source sections 30, a partial current from a second of the source sections and no current from a third source section. Thus, as shown in FIGURE 2(b), the source section $30_1$ will provide a current $I_{S1}$ which is equal to the current $I_{L1}$ through the diode $32_1$. In other words, the current $I_{SH1}$ through shunt path $48_1$ will be equal to zero. This condition will occur because the control or error voltage provided by the amplifier 44 will be insufficient to cause the control device $46_1$ to initiate conduction in shunt path $48_1$.

On the other hand, partial current must be delivered to the supply line 34 from source section $30_2$. However, it is also necessary that the voltage supplied by section $30_2$ be equal to the load voltage $V_L$. Accordingly, the source section $30_2$ must supply current $I_{S2}$. Inasmuch as only current $I_{L2}$ should be delivered through the diode $32_2$ to the supply line 34, it is necessary that the shunt path $48_2$ draw shunt current $I_{SH2}$. The shaded area in FIGURE 2(c) of course represents the power dissipated in shunt path $48_2$.

Inasmuch as it was not required that source section $30_2$ supply its full output current, then of course source section $30_N$ need supply no current $I_{LN}$ to the supply line. Thus, a current $I_{SHN}$ saturating the shunt path $48_N$ will flow therethrough.

From the explanation of FIGURE 2(a), it should be apparent that shunt path $48_N$ is saturated and therefore dissipates very little power equal to the product of the saturation current and saturation voltage. The shunt path $48_1$ on the other hand is in a fully off or nonconducting state and therefore dissipates no power except perhaps for very small amounts attributable to leakage currents. The shunt path $48_2$ is operating in a linear operating range and dissipates power represented by the shaded portion illustrated in FIGURE 2(c). It should however be appreciated that this shaded area is considerably smaller than the shaded area of FIGURE 1(b). Accordingly, it should be appreciated that the configuration of FIGURE 2(a) in which a plurality of parallel shunt paths are controlled such that only one can be operated in a linear range at a time results in a reduction of localized heat dissipation as compared with conventional systems.

Attention is now called to FIGURE 3(a) which illustrates an improved embodiment of the invention in which each of the source sections shown in FIGURE 2(a) is comprised of two or more subsections connected in series with the shunt paths operating on only one of the subsections. More particularly, the embodiment of FIGURE 3(a) contemplates employing a plurality of parallel paths as shown in FIGURE 2(a) except however instead of employing a single source section in each path, the embodiment of FIGURE 3(a) contemplates connecting source subsections in series. Thus, source subsections $50_{1A}$ and $50_{1B}$ are connected in series with a diode $52_1$ between supply lines 54 and 56. Similarly, source subsections $50_{2A}$ and $50_{2B}$ are connected in series with diode $52_2$ between lines 54 and 56. Also, source subsections $50_{NA}$ and $50_{NB}$ are connected in series with diode $52_N$ between lines 54 and 56. Load 58 is connected between lines 54 and 56. As before, a comparator 60 is connected to a source of reference voltage 62 to compare the load voltage $V_L$ with the reference voltage. The output of the comparator 60 is connected to an error amplifier 64 which provides a voltage control signal to control shunt paths.

In the embodiment of FIGURE 3(a), the shunt paths are defined by power transistors 66. Thus, the emitter collector path of transistor $66_1$ is connected across source subsection $50_{1B}$. Similarly, the emitter collector paths of power transistors $66_2$ and $66_N$ are respectively connected across the source subsections $50_{2B}$ and $50_{NB}$. Connected between the base of each of the power transistors 66 and the error amplifier 64 is a Zener diode 68 which performs the function of the control devices 46 shown in FIGURE 2(a). Thus, Zener diodes $68_1$, $68_2$, and $68_N$ are respectively connected to the bases of power transistors $66_1$, $66_2$, and $66_N$.

In order to facilitate an understanding of the embodiment of FIGURE 3(a), the characteristic curves of FIGURES 3(b)–(g) have been selected such that each pair of subsections connected in series is equivalent to one of the supply sections shown in FIGURE 2(a). More particularly, it will be noted that the characteristic curves of subsections $50_{1A}$ and $50_{1B}$ shown respectively in FIGURES 3(b) and 3(c) can be added to obtain the characteristic curve of section $30_1$ shown in FIGURE 2(b). Similarly, the sum of the curves of FIGURES 3(d) and 3(e), respectively representing the characteristics of subsections $50_{2A}$ and $50_{2B}$, equals the curve of FIGURE 2(c), and the sum of the curves of FIGURES 3(f) and 3(g), respectively representing the characteristics of subsections $50_{NA}$ and $50_{NB}$, equals the curve of FIGURE 2(d).

Assume as before that the load 58 draws a current $I_L$ which is of a magnitude requiring the full output of subsections $50_{1A}$ and $50_{1B}$, a partial output from subsections $50_{2A}$ and $50_{2B}$ and no output from subsections $50_{NA}$ and $50_{NB}$. More particularly, note in FIGURES 3(b) and 3(c) subsections $50_{1A}$ and $50_{1B}$ supply a current $I_{L1}$ and respectively provide output voltages $V_{1A}$ and $V_{1B}$. The sum of $V_{1A}$ and $V_{1B}$ is equal to the load voltage $V_L$. Inasmuch as the full output of subsections $50_{1A}$ and $50_{1B}$ is required, no shunt current $I_{SH1}$ flows through transistor $66_1$. This condition of course will occur if the control voltage provided by the error amplifier 64 is insufficient to break down Zener diode $68_1$.

It will be noted that the subsections $50_{2A}$ and $50_{2B}$ provide a current $I_{L2}$ through diode $52_2$. As can be seen in FIGURE 3(d), subsection $50_{2A}$ will provide an output voltage $V_{2A}$. Providing a current $I_{L2}$, subsection $50_{2B}$ will provide a voltage $V_{2B'}$ where the sum of $V_{2A}$ and $V_{2B'}$ is greater than $V_L$. Consequently, subsection $V_{2B}$ must provide a greater current $I_{S2}$ to reduce its output voltage to $V_{2B}$ such that the sum of $V_{2A}$ and $V_{2B}$ equals $V_L$. The difference in current between $I_{S2}$ provided by subsection $50_{2B}$ and $I_{L2}$ provided by subsection $50_{2A}$ represents of course the magnitude of the shunt current $I_{SH2}$ which must be drawn through the power transistor $66_2$. The magnitude of the shunt current $I_{SH2}$ is of course determined by the magnitude of the control voltage provided by the amplifier 64. As should be clear from FIGURES 3(d) and 3(e), the control voltage is of a magnitude sufficient to break down Zener diode $68_2$ but is insufficient to saturate transistor $66_2$.

With respect to subsection $50_{NB}$ however, the control voltage is sufficient to break down the Zener diode $68_N$ and saturate transistor $66_N$. Thus, the current $I_{SHN}$ will be drawn through the power transistor $66_N$ and only the saturation voltage $V_S$ will exist across subsection $50_{NB}$. Inasmuch as the sum of $V_S$ and $V_{NA}$ will be equal to or less than $V_L$, diode $52_N$ will be reverse biased and therefore no current will be supplied to the load by subsection $50_{NA}$.

As in FIGURE 2(a), it should be appreciated that all but one of the power transistors 66 is operating in either a fully off or saturated state. Thus, only the transistor $66_2$ in FIGURE 3(a) is operating in a linear region. Its power dissipation is represented by the shaded area in FIGURE 3(e) and it should be appreciated that this area is even smaller than the corresponding dissipation area shown in FIGURE 2(c) inasmuch as a lower voltage will exist across the shunt path. Thus, FIGURE 3(a) even further reduces localized heat dissipation.

It will be appreciated of course that once one of the power transistors 66 in FIGURE 3(a) is saturated, it is not desirable that the base current therethrough continue to increase as the control voltage provided by the error amplifier 64 increases. Accordingly, the configuration of FIGURE 3(a) can be modified by substituting the arrangement shown in FIGURE 4 for the arrangements enclosed within each of the dotted line boxes shown in FIGURE 3(a). Thus, a current limiter 80 is preferably connected in series with the voltage sensing control device or Zener diode 68. In order to require even less current from the error amplifier to saturate the power transistor 66, an additional stage of current gain can be incorporated between the Zener diode 68 and power transistor 66 as shown in FIGURE 4. More particularly, a transistor 82 can be employed whose collector is connected to the upper terminal of the supply subsection A and whose emitter is connected to the base of transistor 66. Thus, utilizing the configuration of FIGURE 4, a smaller current from the error amplifier 64 is required to saturate the shunt path than is required in FIGURE 3(a). More particularly, the smaller current provided by the error amplifier controls the transistor 82 which in turn develops a larger base current for transistor 66 sufficient to saturate it.

It should be appreciated that in both embodiments of the invention thus far described, illustrated in FIGURES 2 and 3, the dissipative elements, i.e. the power transistors are connected in shunt across the power source sections. Attention is now called to FIGURE 5 which illustrats a further embodiment of the invention in which the dissipative power transistors are connected in series with the power source sections. Like in the embodiments of FIGURES 2 and 3, the dissipative elements are sequentially controlled so that only one operates in a linear range at a time with all other dissipative elements either defining a full on or full off condition.

More particularly, the embodiment of FIGURE 5 includes power source sections $90_1$, $90_2$ and $90_N$ which can be identical to the power source sections illustrated in FIGURE 2. Each section 90 is connected in series with the emitter-collector path of a power transistor 92 between supply lines 94 and 96. Thus, sources $90_1$, $90_2$, and $90_N$ are respectively connected to transistors $92_1$, $92_2$, and $92_N$. The base of each of the transistors 92 is connetced through a voltage control device 98, which can for example comprise a Zener diode, to the output of an error amplifier 100. As in the previously discussed embodiments, the Zener diodes $98_1$, $98_2$, and $98_N$ are selected to break down at different voltage levels. The error amplifier 100 is responsive to the output of a voltage comparator 102 which is connected between the supply line 94 and a source of reference voltage 104. A load 106 is of course connected between supply lines 94 and 96.

In order to understand the operation of the embodiment of FIGURE 5, assume initially that the load current $I_L$ being drawn by load 106 is at a maximum. This will require that source sections $90_1$, $90_2$, and $90_N$ respectively supply currents $I_{L1}$, $I_{L2}$ and $I_{LN}$ corresponding to the load voltage $V_L$. The system is designed such that for this situation, all of the transistors 92 are saturated. That is, unless the voltage $V_L$ tends to exceed the voltage provided by reference source 104, the comparator 102 will control the error amplifier 100 such that it breaks down all of the Zener diodes 98 to drive the transistors 92 into saturation. Assume now that the load current demand decreases such that the voltage $V_L$ tends to increase. As a consequence, the output from the error amplifier 100 will fall, thus reducing the base drive currents to the transistors $92_1$ and initially taking transistor $92_N$ out of saturation to accordingly reduce the current $I_L$ as required. As a consequence of the reduction of current $I_{LN}$, the output voltage of source $90_N$ will increase. However, the voltage drop across the emitter-collector path of transistor $92_N$ will also increase to thus maintain the voltage $V_L$ between supply lines 94 and 96. As the load current demand decreases further, transistor $92_N$ will become off biased or open circuited. As should be appreciated, the circuit is designed so that the next transistor, i.e. $92_2$, comes out of saturation into the linear operating range at about the same level at which transistor $92_N$ becomes nonconductive. Accordingly, for any level of load current demand within an intended operating range, only one of the transistors 92 will be operating in a linear region and all others will either be saturated or open circuited. As a conseqence, as with the shunt path embodiments of FIGURES 2 and 3, localized power dissipation will be reduced as compared to prior art systems.

From the foregoing, it should be appreciated that voltage limiting systems have been shown herein in which localized heat dissipation is reduced as compared to prior art systems. The improved performance of embodiments of the present invention is essentially attributable to the concept of sequentially controlling the dissipation paths so that no more than one path operates in a linear region at any one time. In addition, it should also be appreciated that systems in accordance with the invention possess a high degree of reliability as a consequence of their inherent redundancy. Thus, an open circuit failure mode in one section will merely result in another section being driven into saturation if required. Short circuit failure modes are compensated for by the automatic removal of the dissipation path of another section from a saturated condition.

Although it has been assumed herein that all of the power source sections or subsections have identical output characteristics, it should be appreciated that this is not essential to the invention and has been assumed only to simplify the explanation. It should also be understood that although several specific embodiments of the invention have been shown herein, it is recognized that modifications and variations falling within the scope of the invention will readily occur to those skilled in the art. For example only, other known devices can be substituted for the Zener diodes and transistors illustrated. Accordingly, it is not intended that the scope of the invention be limited by the specific embodiments discussed.

What is claimed is:
1. In combination with a supply line having a variable load coupled thereto, power source means connected to said supply line for establishing a predetermined voltage thereon over a wide range of load current demands, said power source means comprising:
   a plurality of first power source sections connected to said supply line in parallel;
   a plurality of actuatable dissipation paths each connected to a different one of said first sections; and
   means responsive to a changing difference between the voltage on said supply line and said predetermined voltage for actuating said dissipation paths in accordance with a predetermined sequence.
2. The combination of claim 1 wherein each of said dissipation paths is connected in shunt across a different one of said first sections.
3. The combination of claim 1 wherein each of said dissipation paths is connected in series with a different one of said first sections.
4. The combination of claim 1 wherein each of said dissipation paths can define a full off state, a full on state, and a linear operating condition; and
   means for assuring that no more than one dissipation path defines a linear operating condition for any single value of said difference between said voltage on said supply line and said predetermined voltage.
5. The combination of claim 1 including a source providing said predetermined voltage; and
   comparator means connected to said supply line and said source for providing a control signal proportional to the difference therebetween.
6. The combination of claim 5 wherein each of said dissipation paths includes a transistor capable of defining an off condition, a saturated condition and a linear operating condition; and
   means responsive to each value of said control signal for causing no more than one of said transistors to define said linear operating condition at a time and all other of said transistors to define either an off or saturated condition.
7. The combination of claim 6 wherein said means responsive to said control signal includes a plurality of voltage sensing devices each coupled to a different one of said transistors, each of said voltage sensing devices being responsive to a different voltage value.
8. The combination of claim 7 wherein each of said voltage sensing devices comprises a Zener diode.
9. The combination of claim 1 including a plurality of second power source sections, each second section being connected in series with a different one of said first sections.
10. The combination of claim 9 including a source providing said predetermined voltage; and
    comparator means connected to said supply line and said source for providing a control voltage signal proportional to the difference therebetween.
11. The combination of claim 10 wherein each of said dissipation paths includes a transistor capable of defining an off condition, a saturated condition and a linear operating condition;
    a plurality of voltage sensing devices each responsive to a different value of control voltage signal; and
    a plurality of gain means each coupling a different one of said sensing devices to a different one of said first transistors.
12. The combination of claim 11 wherein each of said gain means comprises a second transistor.
13. The combination of claim 11 wherein each of said voltage sensing devices comprises a Zener diode; and
    a plurality of current limiters each connected in series with a different one of said Zener diodes.

References Cited

UNITED STATES PATENTS 3,238,438  3/1966  Rhyne _____ 307—44 X
3,356,855  12/1967  Suzuki et al. _____ 307—44 X JOHN F. COUCH, Primary Examiner A. D. PELLINEN, Assistant Examiner U.S. Cl. X.R.

307—69; 323—1, 19